(12) United States Patent
Lai et al.

(10) Patent No.: US 8,503,114 B2
(45) Date of Patent: Aug. 6, 2013

(54) LENS MODULE WITH SPACERS

(75) Inventors: Chien-Nan Lai, New Taipei (TW); Hung-Lung Ho, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 72 days.

(21) Appl. No.: 13/335,966

(22) Filed: Dec. 23, 2011

(65) Prior Publication Data

US 2013/0033751 A1 Feb. 7, 2013

(30) Foreign Application Priority Data

Aug. 2, 2011 (TW) ................................ 10127323 A

(51) Int. Cl.
*G02B 7/02* (2006.01)
(52) U.S. Cl.
USPC ......................................................... 359/811

(58) Field of Classification Search
USPC ................. 359/811, 819, 821, 830, 784, 796, 359/797; 396/529
See application file for complete search history.

(56) References Cited

U.S. PATENT DOCUMENTS

| | | | |
|---|---|---|---|
| 7,755,857 B2 * | 7/2010 | Yu | 359/819 |
| 7,969,668 B2 * | 6/2011 | Chou | 359/819 |

* cited by examiner

*Primary Examiner* — Tuyen Tra
(74) *Attorney, Agent, or Firm* — Altis Law Group, Inc.

(57) ABSTRACT

A lens module includes a lens barrel, a first lens, a second lens, a third lens, and two spacers. The lens barrel includes an object-side end and an image-side end. The first, second, and third lenses are received in the lens barrel and arranged in that order from the object-side to the image-side. One of the two spacers is positioned between the first lens and the second lens, and the other of the two spacers is positioned between the second lens and the third lens. Each of the spacers is chamfered to prevent the ingress of unwanted light.

8 Claims, 3 Drawing Sheets

LENS MODULE WITH SPACERS

BACKGROUND

1. Technical Field

The present disclosure relates to lens modules and, particularly, to a lens module with spacers.

2. Description of Related Art

In related art, lens modules include a first lens, a second lens, and a spacer. The spacer is disposed between the first lens and the second lens and used for blocking unwanted light rays. However, the spacer is typically annular and includes a cylindrical inner surface, which may redirect light rays onto the second lens and adversely affect the image quality.

Therefore, it is desirable to provide a lens module, which can overcome the limitations described.

DETAILED DESCRIPTION

Embodiments of the disclosure will now be described in detail, with reference to the accompanying drawings.

Figure 1:
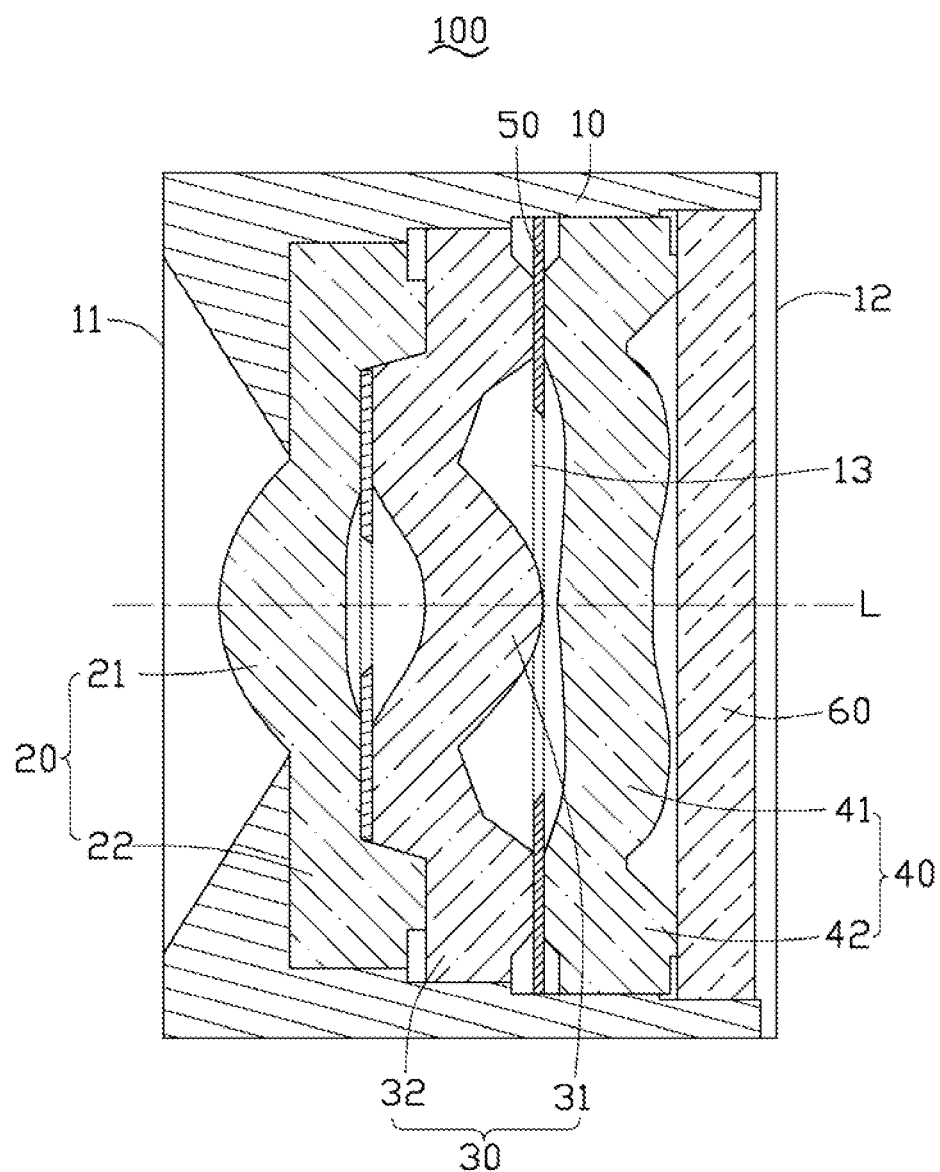
FIG. 1 is a cross-sectional schematic view of a lens module of an exemplary embodiment.

Referring to FIG. 1, a lens module 100, according to an exemplary embodiment, includes a lens barrel 10, a first lens 20, a second lens 30, a third lens 40, at least two spacers 50, and a filter glass 60.

The lens barrel 10 is tubular and includes an object-side end 11 and an image-side end 12 opposite to the object-side end 11. The lens barrel 10 defines a receiving room 13 extending through the object-side end 11 and the image-side end 12.

In this embodiment, the lens barrel 10 is made of light-shielding/opaque/black material(s).

The first lens 20 is received in the receiving room 13, adjacent to the object-side end 11. The first lens 20 includes a first optical portion 21 and a first non-optical portion 22 surrounding the first optical portion 21.

The second lens 30 is received in the receiving room 13 between the first lens 20 and the third lens 40. The second lens 30 includes a second optical portion 31 and a second non-optical portion 32 surrounding the second optical portion 31.

The third lens 40 is received in the receiving room 13, adjacent to the image-side end 12. The third lens 40 includes a third optical portion 41 and a third non-optical portion 42 surrounding the third optical portion 41.

In this embodiment, the first lens 20, the second lens 30, and the third lens 40 are made of glass or plastic, and may be spherical or aspheric lenses. The first optical portion 21, the second optical portion 31, and the third optical portion 41 are for forming images and it is desirable that all light rays entering into the lens barrel 10 are collected to pass therethrough. The first non-optical portion 22, the second non-optical portion 32, and the third non-optical portion 42 are incidental and it is desired that no, or as few as possible, light rays pass therethrough. In other embodiments, other lenses can be included and arranged at appropriate positions at the two sides of the first lens 10 and the second lens 20.

Figure 2:
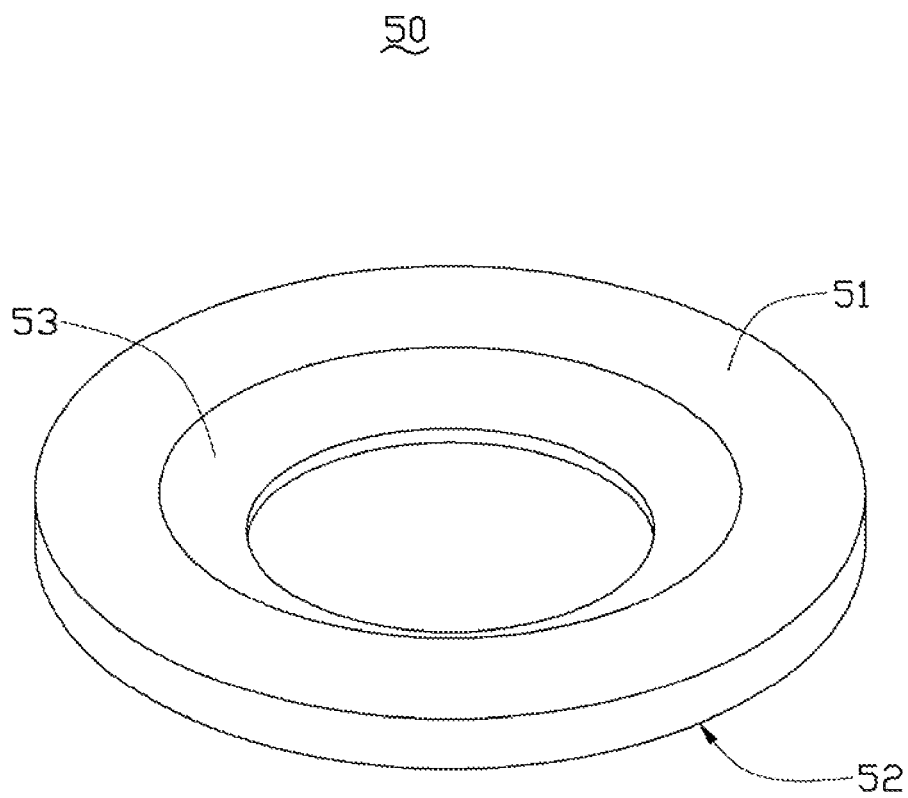
FIG. 2 is an isometric schematic view of a spacer of the lens module of FIG. 1.
Figure 3:
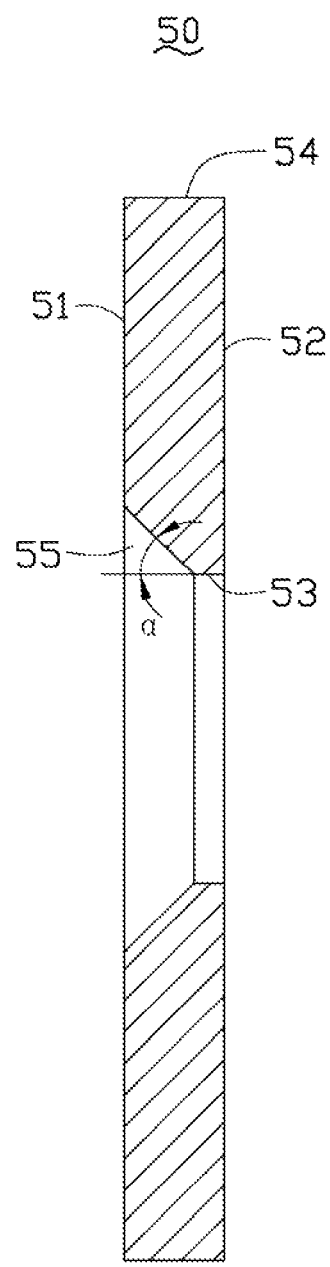
FIG. 3 is a cross-sectional schematic view of the spacer of FIG. 2.

Referring to FIGS. 2-3, each of the spacers 50 is an annular plate and made of light-shielding/opaque/dark material(s). The spacers 50 are received in the receiving room 13, and are positioned between the first lens 20 and the second lens 30, and between the second lens 30 and the third lens 40. Each spacer 50 includes an object-side surface 51, an image-side surface 52, a cylindrical inner sidewall 53, and a cylindrical outer sidewall 54. The object-side surface 51 faces the object-side end 11 of the lens module 10, and the image-side surface 52 faces the image-side end 12. The inner sidewall 53 and the outer sidewall 54 are parallel with an optical axis L of the lens module 100.

The intersection of the first surface 51 and the inner surface 53 form a chamfer 55. In this embodiment, the chamfer 55 is beveled. An included angle a is formed between the chamfer 55 and the optical axis L of the lens module 100. The included angle a is open toward the object-side end 11 and is larger than about 30 degrees but less than about 60 degrees. A spacer of the spacers 50 is sandwiched between the first non-optical portion 22 and the second non-optical portion 32, and another spacer 50 is sandwiched between the second non-optical portion 32 and the third non-optical portion 42.

The filter glass 60 is a plate, and received in the receiving room 13 for covering the image-side end 12 of the lens barrel 10. The filter glass 60 filters or absorbs infrared light from the light rays penetrating to the third lens 40.

In use, light rays enter into the lens module 100 from the object-side end 11 of the lens barrel 10 and strike the first lens 20. A first part of the light rays penetrates through the first optical portion 21, through a through hole (not labeled) of the spacer 50 positioned between the first lens 20 and the second lens 30, through the second optical portion 31, through a through hole (not labeled) of the spacer 50 positioned between the second lens 30 and the third lens 40, and through the third optical portion 41, and then meets an image sensor (not shown). A second part of the light rays penetrates through the first non-optical portion 22 and/or the second non-optical portion 32, and is then blocked by the spacers 50. A third part of the light rays penetrates through the first optical portion 21 and/or the second optical portion 31, and then strikes the chamfer 55 of a spacer 50. As the chamfer 55 faces the object-side end 11, the light rays striking the chamfer 55 will not be reflected from the chamfer 55 onto the second lens 30 or onto or into the third lens 40.

The lens module 100 may further include a fourth lens, a fifth lens, and another two spacers 50. A spacer 50 is positioned between the third lens 40 and fourth lens, and another spacer 50 is positioned between the fourth lens and the fifth lens.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens module, comprising:
    a lens barrel comprising an object-side end and an image-side end opposite to the object-side end;
    a first, second, and third lenses received in the lens barrel and arranged in this order from the object-side end to the image-side end;
    two spacers positioned, one of the two spacers positioned between the first lens and the second lens, and the other of the two spacers positioned between the second lens and the third lens,
    wherein each of the spacers is an annular plate, and comprises an object-side surface, an image-side surface opposite to the object-side surface, an inner sidewall and a chamfer, the object-side surface faces the object-side end, the image-side surface faces the image-side end, the chamfer is positioned at an intersection of the object-side surface and the inner sidewall.

2. The lens module of claim 1, wherein the chamfer is beveled.

3. The lens module of claim 2, wherein an included angle between the chamfer and an optical axis of the lens module is greater than about 30 degrees and less than about 60 degrees.

4. The lens module of claim 1, further comprising a filter glass received in the lens barrel for covering the image-side end of the lens barrel.

5. The lens module of claim 1, wherein the first lens comprises a first optical portion and a first non-optical portion surrounding the first optical portion.

6. The lens module of claim 5, wherein the second lens comprises a second optical portion and a second non-optical portion surrounding the second optical portion.

7. The lens module of claim 6, wherein the third lens comprises a third optical portion and a third non-optical portion surrounding the third optical portion.

8. The lens module of claim 7, wherein one of the two spacers is sandwiched between the first non-optical portion and the second non-optical portion, and the other of the spacers is sandwiched between the second non-optical portion and the third non-optical portion.

\* \* \* \* \*